United States Patent [19]

Houston

[11] Patent Number: 4,506,369
[45] Date of Patent: Mar. 19, 1985

[54] HIGH POWER CESIUM LAMP SYSTEM FOR LASER PUMPING

[75] Inventor: John M. Houston, Schenectady, N.Y.

[73] Assignee: General Electric Company, Schenectady, N.Y.

[21] Appl. No.: 405,826

[22] Filed: Aug. 6, 1982

[51] Int. Cl.³ .................. H01S 3/092; H01J 13/00
[52] U.S. Cl. ............................ 372/72; 313/25; 313/44; 372/34; 372/35
[58] Field of Search ............. 372/35, 70, 72, 34; 313/163, 25, 34, 36, 44

[56] References Cited

U.S. PATENT DOCUMENTS 4,173,728 11/1979 Witting ..................... 313/163

OTHER PUBLICATIONS

Czarniewski, "Spectral Filter for a NJ:YAIG Pumping Cavity", Applied Optics, vol. 10, No. 6, Jun. 1971, pp. 1460-1461.

*Primary Examiner*—James W. Davie
*Attorney, Agent, or Firm*—Lawrence D. Cutter; James C. Davis, Jr.; Marvin Snyder

[57] ABSTRACT

A long-life cesium lamp is disposed within an evacuable outer envelope surrounding a cesium lamp arc tube with their respective surfaces spaced a fixed distance apart so that a heat-transferring gas, such as helium, is disposed between the arc tube and the wall of the outer envelope. Furthermore, means are provided for cooling the outer envelope, such as by surrounding it with a water jacket. The resulting lamp system is capable of operating at higher levels of average lamp power and arc tube wall loading (watts/cm²) without causing too low a cesium pressure, as would happen if one directly water-cooled the alumina arc tube, and without causing too high an alumina arc tube temperature, as would happen if one merely evacuated the outer envelope. The lamp system of the present invention is also employed in a housing in which the lamps are disposed along the foci of a dual-elliptical cavity so that light emissions from the lamps are focussed upon a slab of lasing material, so as to form, for example, a neodymium-YAG laser.

14 Claims, 6 Drawing Figures

HIGH POWER CESIUM LAMP SYSTEM FOR LASER PUMPING

BACKGROUND OF THE DISCLOSURE

The present invention relates to lamps and lamp systems for laser pumping. More particularly, the present invention relates to a means for increasing the power supplied to pulsed cesium lamps which are particularly useful for laser pumping.

A pulsed cesium lamp which is particularly efficacious for pumping of neodymium glass or neodymium-YAG lasers is described in U.S. Pat. No. 4,173,728, issued Nov. 6, 1979 to Dr. Harald L. Witting, and assigned to the same assignee as the present invention. The Witting patent discloses a cesium-vapor lamp which can be pulsed at high currents to produce intense light pulses useful for laser pumping and thyristor triggering. For example, typical currents in the cesium lamp have been measured to be as high as 300 amperes for as long as 200 microseconds. Such lamps may be constructed by filling an alumina arc tube with a cesium-mercury amalgam, rather than with the conventional sodium-mercury amalgam employed in high pressure sodium lamps. Furthermore, in the cesium lamp described in the above Witting patent, which is hereby incorporated herein by reference as background material, there is a pool of liquid cesium disposed in the lower portion of the arc tube. In this cesium-vapor lamp, bare tungsten electrodes are employed since cesium adsorbs strongly on bare tungsten metal, thereby producing a strongly-electron-emitting surface. Life tests conducted on the Witting lamp have shown that such lamps can produce in excess of 9 billion pulses with no degradation in light output. In contrast, xenon flash lamps which are widely used for intense light pulses for pumping neodymium lasers yield, at best, about 10 million light pulses. Furthermore, the Witting patent discloses the fact that these cesium-vapor lamps may be employed for pumping both neodymium glass or neodymium-YAG lasers.

Certain lasers, such as neodymium-YAG lasers, are conventionally pumped with light from xenon flash lamps. For example, a slab of laser material is typically enclosed in a highly reflecting dual elliptical cavity which focusses the lamp from two xenon flash lamps onto a slab of lasing material. Many such lasers are employed in high power applications wherein it is necessary to cool the xenon flash lamps, such as by surrounding them with an outer jacket through which cooling water is pumped. Because of such cooling systems, the quartz envelope of xenon flash lamps can be operated at a high average wall loading, such as, for example, 30 watts/cm$^2$. The peak loading is, of course, much higher than this because the lamp is pulsed on only for several hundred microseconds and then is turned off for a much longer period of time, such as for approximately 0.1 second.

The problems of supplying higher average power to pulsed cesium-vapor lamps is central to the proper understanding of the present invention. In particular, it should be appreciated that for the cesium-vapor lamp, there is a significant problem with increasing the power to the lamp, and thus with increasing the wall loading of the lamp in such a manner so as to remove heat from the alumina arc tube without cooling the arc wall below a temperature of about 500° C. so as to maintain the required cesium vapor pressure in the lamp, which is preferably approximately 70 Torr. Simple water cooling systems such as those employed for conventional xenon flash lamps are inapplicable to the cooling of cesium-vapor lamps. In order to maintain the proper operating temperature of the arc tube walls in previously-developed cesium-vapor lamps, they are provided with outer envelopes. Furthermore, the space between the arc tube and the outer envelope is evacuated and thereby forms a vacuum gap. It is thus seen that water cooling of the outer envelope produces essentially no change in allowable arc tube wall loading, since radiation transfer across the vacuum gap is not at all sensitive to the outer envelope temperature, as long as it is significantly cooler than the arc tube. Direct water cooling of the arc tube itself is not possible because of the necessarily high arc tube wall temperatures which are required. Even though cesium-vapor lamps presently exhibit an average wall loading limit of about 22 watts/cm$^2$, increases in this limit are highly desirable.

The cesium-vapor lamp described in the Witting patent is similar to high pressure sodium lamps which have been widely employed in the past for outdoor lighting purposes. These two lamp types are linked primarily by the fact that each preferably employs an alumina arc tube. High pressure sodium lamps have employed sintered alumina arc tubes with niobium leads passing through the alumina arc tube end caps. The electrodes of high pressure sodium lamps are made of tungsten which has been coated with a thorium or barium compound to reduce the work function. In high pressure sodium lamps, fill gas comprises metallic sodium, mercury and an inert gas, such as xenon, to aid in starting and which further acts to reduce heat flow from the arc to the arc tube wall. In such lamps the sodium and mercury are placed into the lamp during manufacture in the form of an amalgam pellet. As in cesium-vapor lamps, high pressure sodium lamps also exhibit a maximum wall loading of about 22 watts/cm$^2$. The actual heat conduction from the arc to the alumina arc tube wall is only approximately 35% of this value, the balance of the energy flow being radiation (visible and infrared) which is radiated through the alumina wall from the arc. Because the efficacy (that is, the lumens/watt output) of a high pressure sodium lamp improves with increasing arc tube wall temperature, the arc tubes are sized so that the alumina wall runs as hot as possible, consistent with long lamp life. This maximum wall temperature is approximately 1,500° K. in commercial lamps. These sodium lamps have evacuated, outer vacuum jackets, the jacket being much larger in diameter than the arc tube. The heat conducted from the arc to the arc tube wall (approximately 8 watts/cm$^2$) must thus be radiated from the arc tube wall to the outer jacket and to the external surroundings. Because alumina has a low emissivity in the visible spectrum region, this radiation occurs mainly in the infrared region at wavelengths longer than approximately 3 microns.

In sum, cesium-vapor lamps, which are similar to high pressure sodium lamps in that they employ alumina arc tubes, have been described in the past as being useful for laser pumping, especially laser pumping of neodymium-YAG lasers. However, increasing the average power supplied to the cesium-vapor lamp is difficult because of the present wall loading limit of approximately 22 watts/cm$^2$. Furthermore, conventional cooling methods and devices for laser lamps are not employable with cesium-vapor lamps because of the necessity of maintaining the arc tube wall temperature at 500° C. or higher.

SUMMARY OF THE INVENTION

In accordance with a preferred embodiment of the present invention, a cesium-vapor lamp, such as that described in the Witting patent, is further provided with an evacuable outer envelope surrounding the arc tube and disposed so that the surface of the arc tube and the surface of the outer envelope are spaced a fixed distance apart so as to enclose a heat transferring gas between the arc tube and the outer envelope. Furthermore, means, such as an outer transparent water jacket, are provided for cooling the outer envelope. Helium is preferred as a heat-transferring gas in the present invention.

In a further embodiment of the present invention, a light system for laser pumping comprises two cesium-vapor lamps having the above-described helium-filled outer envelope, the lamps being disposed in a housing having an elongate cavity with a cross section comprising a pair of overlapping elliptical portions, the foci of the ellipses lying on a straight line so as to thereby define a pair of inner and a pair of outer foci lines extending along the elongate direction of the cavity. The lamps are disposed along the lines of the outer foci so that light from said lamps is directed to portions along their respective inner foci.

Lastly, the present invention also comprises a laser system in which the above-described light and light reflection system has contained therein a slab of lasing material lying along the lines of the inner foci. In particular, a preferred embodiment of the invention comprises a slab of neodymium-YAG lasing material.

Accordingly, it is an object of the present invention to increase the maximum power supplyable to a cesium-vapor lamp.

It is also an object of the present invention to provide means for operating cesium-vapor lamps at higher levels of arc tube wall loading.

It is a further object of the present invention to provide a lamp system for laser pumping, particularly one which is suitable for use in neodymium-YAG lasing material.

Lastly, it is an object of the present invention to provide a light system for laser pumping together with a laser system incorporating a cesium-vapor light generating and reflecting system.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
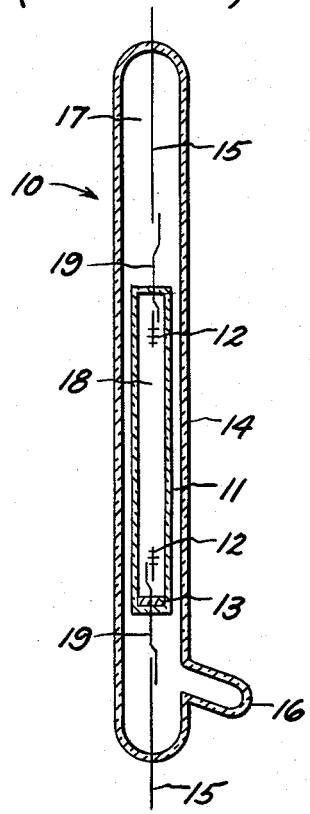
FIG. 1 is a cross-sectional side elevation view of a cesium-vapor lamp, such as that described in the above-mentioned Witting patent.

FIG. 1 illustrates a previously-developed form of cesium-vapor lamp 10, such as that described in the above-incorporated Witting patent. In particular, tungsten electrodes 12 are disposed at each end of alumina arc tube 11 having a typical outside diameter of 5 mm, an inside diameter of 4 mm, and a length of 54 mm. Bare tungsten electrodes 12 are supported on niobium wire supports disposed through the alumina arc tube. The niobium wire typically possesses a diameter of approximately 0.6 mm. A cesium amalgam pool 13 is disposed within arc tube 11 and during operation provides a discharge medium 18 through which the lamp current passes. The discharge medium preferably comprises cesium vapor or a mixture of cesium and mercury vapors. The preferable cesium-vapor pressure range during lamp operation is between about 5 and about 150 Torr with a pressure of 70 Torr being more desirable. Arc tube 11 is disposed within outer heat-resistant glass envelope 14 which typically possesses an outside diameter of 9 mm, an inside diameter of 8 mm, and a length of 120 mm. Niobium wires 19, disposed through the ends of arc tube 11, are further attached to tungsten wire leads 15 extending through outer envelope 14. Typically, wire leads 15 possess a diameter of approximately 1 mm. Pinch-off stem 16 is employed to provide a vacuum within volume 17, lying between arc tube 11 and outer envelope 14.

The wall loading in such a lamp is presently limited to a maximum of approximately 22 watts/cm$^2$. In such a cesium-vapor lamp, the alumina arc tube wall must be maintained at a temperature in excess of approximately 500° C. to provide the required cesium-vapor pressure in the lamp which is preferably approximately 70 Torr. As mentioned above, such a lamp is not suitable for conventional cooling approaches applied to either arc tube 11 or outer envelope 14.

Figure 2:
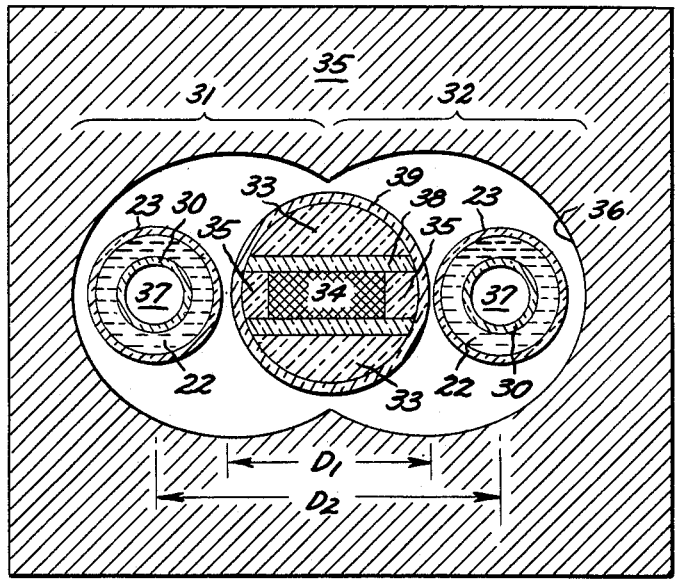
FIG. 2 is a cross-sectional side end view of a conventionally-constructed neodymium-YAG laser system employing xenon flash tubes.

FIG. 2 illustrates a conventional neodymium-YAG laser system employing water-cooled xenon flash lamps. In particular, two xenon flash lamps are employed, each having an outer envelope 30 enclosing the desired xenon-containing discharge medium in volume 37. Outer jacket 23 surrounds each such xenon flash lamp and circulates water through annular volume 22 to provide the necessary cooling for the xenon flash lamps. This form of cooling permits increased power to be supplied to the xenon flash lamps without the concomitant melting or degradation of the walls of arc tube 30. The xenon flash lamps are disposed within housing 35 and, more particularly, within an elongate cavity therein, the cavity having the form of a pair of overlapping elliptical cylinders with the foci of the ellipses being arranged along a common straight line. This arrangement thus defines a pair of inner foci and a pair of outer foci. Thus, the xenon flash lamps are disposed as shown along the foci lines of each right elliptical cylindrical section, 31 and 32. Thus, light produced at or near either of the outer foci is directed toward its companion focal point, namely, one of the two inner elliptical foci points. To insure good reflection, the dual elliptical cavity possesses an interior surface having a reflective coating 36 such as may be provided by silver or silver deposition. In a typical neodymium-YAG laser system, powered by xenon flash lamps, the outer elliptical foci are separated by a distance $D_2$ of about 44 mm. The centers of each ellipse, that is the mid-points between their respective foci, are typically separated by a distance $D_1$ of about 26 mm. In a typical laser system such as that shown in FIG. 2, xenon lamp arc tube 30 typically possesses an outer diameter of approximately 7 mm. Likewise, outer jacket 33 typically possesses an outer diameter of approximately 16 mm, with each wall having a thickness of approximately 1 mm.

Furthermore, in the typical neodymium-YAG laser system shown in FIG. 2, a slab of lasing material 34 is disposed along dual elliptical cavity 31 and 32 in housing 35 so as to include both of the above-described inner foci in its volume. Preferably, the two inner foci are disposed at or near the same point. Lasing material 34 is disposed between slabs 38 which typically comprise a material such as Pyrex ®. Slabs 38 are each approximately 2 mm thick. Each slab 38 may have a reflective coating disposed on the surface thereof which is in closest proximity to lasing material 34. Furthermore, optically translucent filler material 33 and 35 is disposed within support tube 39 which acts to hold the lasing material in a fixed, preselected position. Support tube 39 typically comprises a translucent material such as glass or quartz and possesses an inner diameter of approximately 19 mm and an outer diameter of approximately 21 mm.

Figures 3A, 3B:
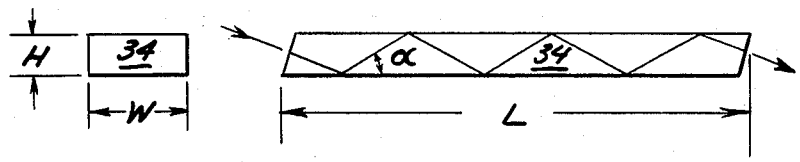
FIG. 3A is an end view of a slab of lasing material.
FIG. 3B is a side view of a slab of lasing material more particularly illustrating a light path therethrough.

FIGS. 3A and 3B illustrate the dimension and shape of a typical neodymium-YAG laser slab. In general, the height H is 6 mm±0.05 mm. The typical width W is 15 mm±0.05 mm. The length is 127.26 mm±0.2 mm. A typical internal optical path exhibits an angle $\alpha$ of 74°±2' with the reflecting surface of the slab.

Figure 4:
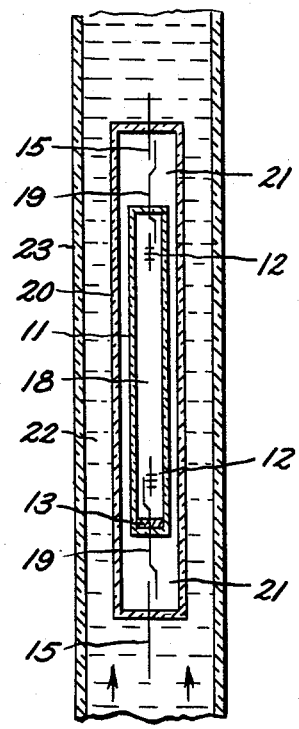
FIG. 4 is a cross-sectional side elevation view of a cesium-vapor lamp for laser pumping in which there is incorporated therein a cooling system in accordance with the present invention.

FIG. 4 illustrates a cesium-vapor lamp which may be advantageously employed in laser applications and, in particular, in the pumping of neodymium-YAG laser material. In particular, there is provided outer envelope 22 surrounding arc tube 11 of the previously-described cesium-vapor lamp 10. Thus, there is defined volume 21 between arc tube 11 and outer envelope 20. This volume is filled with a heat transfer gas exhibiting high heat conductivity. Helium is a preferred gas for this application although neon may also be used. Furthermore, it is critical for the purposes of the present invention that the distance between the wall of arc tube 11 and the wall of outer envelope 20 be appropriately chosen, for the proper transfer of thermal energy through the heat transfer gas to outer envelope 20 and ultimately to the cooling fluid, such as water, flowing between outer jacket 23 and outer envelope 20. The higher the average power supplied to the lamp, the narrower is the desired gap between arc tube 11 and outer envelope 20. Calculations indicate that, when using helium, a gap of 20 mils (0.51 mm) is satisfactory to permit sufficient heat removal for an arc tube wall loading of 28 watts/cm$^2$. If the gap is reduced in half, to 10 mils (0.25 mm), the gap is sufficient to permit heat removal for a wall loading of up to 56 watts/cm$^2$. If the gap is reduced by half yet again, to a distance of 5 mils (0.13 mm), the maximum permissible wall loading increases to approximately 113 watts/cm$^2$. In the instant invention it is preferred that the gap between arc tube 11 and outer envelope 20 have a value less than about 40 mils (1 mm).

The gap between arc tube 11 and outer envelope 20 is preferably filled with approximately 1 atmosphere of helium, although 1 atmosphere of neon may also be used. Neon is preferred in some higher temperature applications since it exhibits somewhat less of a tendency to diffuse through solids, particularly at temperatures near 1,500° K. However, neon generally requires the use of a smaller gap between arc tube 11 and outer envelope 20. The gas pressure is not critical since the thermal conductivity of a gas is independent of pressure, once the pressure is high enough so that molecular flow does not occur. For helium, and a gap of 0.1 mm, the thermal conductivity becomes essentially constant above about 50 Torr.

Figure 5:
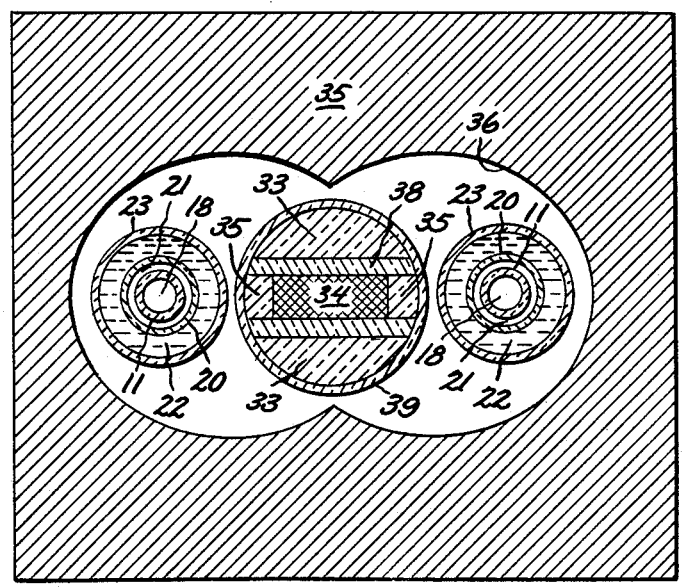
FIG. 5 is a cross-sectional top view of a laser system incorporating cesium-vapor lamps cooled in accordance with the present invention.

FIG. 5 illustrates an embodiment of the present invention in which the lamp of FIG. 4 is disposed in a light-reflecting system, such as that provided by a dual elliptical cavity housing in a manner similar to that employed in laser systems using xenon flash lamps. However, in addition to outer water jacket 23, there is provided additional outer envelope 20 defining volume 21 in which heat transfer gas, such as helium, is disposed. Otherwise, the laser system of FIG. 5 is similar to the laser system shown in FIG. 2.

It has been indicated that there are many advantages to supplying cesium-vapor discharge lamps with a variable steady-state "keep-alive" power. This keep-alive power maintains the cesium vapor in an ionized condition between current pulses, allows lamp warm-up and adjustment of cesium pressure prior to pulsing. It furthermore allows holding cesium vapor pressure, and lamp average power, constant if there is a need to vary the instantaneous pulse power or repetition rate. The helium gap of the instant invention thus provides an added advantage in cesium-vapor lamps maintained in a keep-alive condition in that the lamp is now maintainable at larger, more flexible levels of keep-alive power.

Outer envelope 20 shown in FIGS. 4 and 5 preferably comprise alumina. Glass is suitable for outer envelope 20 if the wall loading of arc tube 11 is maintained at a level of approximately 20 watts/cm$^2$ or below at which level the present invention offers a reduced level of performance advantage. However, alumina is a much better choice for outer envelope 20 since it has a thermal conductivity approximately 22 times higher than that of glass. Additionally, sapphire (single-crystal alumina) is obviously preferably over sintered polycrystalline alumina because it is more transparent. However, it is also considerably more expensive.

The lamp and laser system of the present invention also possesses one other advantage as the result of surrounding alumina arc tube 11 with helium at a pressure of about 1 atmosphere, rather than by providing vacuum conditions. In particular, Campbell and Kroontje have shown that disposing 0.3 atmospheres of argon exterior to an alumina arc tube allows one to raise the arc tube temperature to between 1,700° K. and 1,800° K. before one begins to encounter problems of alumina evaporation. This is to be compared with temperatures of approximately 1,500° K. occurring in vacuum conditions. Campbell and Kroontje have disclosed this in the *Journal of the Illuminating Engineering Society*, page 223, July, 1980.

From the above, it should be appreciated that the present invention provides a means for cooling the arc tube of a cesium-vapor discharge lamp in such a way so as to be able to supply higher average levels of power to the lamp and correspondingly higher levels of arc tube wall loading. This is accomplished while still maintaining the arc tube wall temperature above the required 500° C. level for the development of the desired cesium-vapor pressure. It should be further seen and appreciated that cesium-vapor lamps of the kind considered herein, cannot be cooled in the same manner as that employed for other forms of pulsed lamps, such as the xenon flash lamps. It should be further appreciated that the present invention provides a system which is particularly appropriate for use with neodymium-YAG lasing material and systems.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. The lamp system for laser pumping comprising:
   an evacuable arc tube having a first end and a second end;
   a solid metal anode disposed in the first end of said arc tube;
   a liquid cesium reservoir disposed in the second end of said arc tube;
   a cathode comprising a conductive material capable of adsorbing cesium, said cathode protruding from said reservoir so as to provide a preferred discharge termination point;
   a fill gas, including cesium vapor, disposed within said arc tube between said anode and said cathode;
   an evacuable outer envelope surrounding said arc tube and disposed so that the surface of said arc tube and the surface of said outer envelope are spaced a fixed distance apart, said outer envelope and said arc tube being transmissive to infrared radiation;
   a heat transfer gas disposed within said outer envelope between said arc tube and said outer envelope; and
   means for cooling said outer envelope, said means being external to said envelope.

2. The lamp system of claim 1 in which said heat transfer gas is selected from the group consisting of helium and neon.

3. The lamp system of claim 1 in which said arc tube comprises alumina.

4. The lamp system of claim 1 in which said outer envelope comprises alumina.

5. The lamp system of claim 1 in which said anode comprises tungsten.

6. The lamp system of claim 1 in which said cathode comprises tungsten.

7. The lamp of claim 1 in which said fill gas includes mercury vapor.

8. The lamp system of claim 1 in which said means for cooling comprises an outer jacket surrounding said outer envelope and means for circulating a light-transmissive cooling fluid between said outer jacket and said outer envelope.

9. The lamp system of claim 1 in which the surface of said outer envelope and the surface of said arc tube are spaced apart by a substantially uniform distance of between about 1 mm and about 0.1 mm.

10. A light system for pumping a lasing material comprising:
    two lamps each of which includes an evacuable arc tube having a first end and a second end; a solid metal anode disposed in the first end of said arc tube; a liquid cesium reservoir disposed in the second end of said arc tube; a cathode comprising a conductive material capable of adsorbing cesium, said cathode protruding from said reservoir so as to provide a preferred discharge termination point; a fill gas, including cesium vapor, disposed within said arc tube between said anode and said cathode; an evacuable outer envelope surrounding said arc tube and disposed so that the surface of said arc tube and the surface of said outer envelope are spaced a fixed distance apart, said outer envelope and said arc tube being transmissive infrared radiation; a heat transfer gas disposed within said outer envelope between said arc tube and said outer envelope; and means for cooling said outer envelope, said means being external to said envelope;
    a housing containing an elongate cavity having a cross-section comprising a pair of overlapping elliptical portions, foci of said ellipses lying on a straight line, thereby defining a pair of inner and a pair of outer foci; and
    said lamps being disposed along the line of outer foci extending through said elongate cavity, whereby light from said lamps is directed to points along their respective inner foci lines.

11. The light system of claim 10 further including a light-reflective coating disposed on the interior wall of said cavity.

12. A laser system comprising:
    the light system of claim 10; and
    lasing material disposed along the lines of said inner foci.

13. The laser system of claim 12 in which said lasing material comprises a slab of neodymium-YAG material.

14. A lamp system for laser pumping comprising:
    a cesium-vapor lamp having an arc tube for the passage of a discharge current;
    an evacuable outer envelope surrounding said arc tube and disposed so that the surface of said arc tube and the surface of said outer envelope are spaced a fixed distance apart, said outer envelope and said arc tube being transmissive to infrared radiation;
    a heat transfer gas disposed within said outer envelope between said arc tube and said outer envelope; and
    means for cooling said outer envelope, said means being external to said envelope.

* * * * *